United States Patent
Bjarngard et al.

[15] 3,657,535
[45] Apr. 18, 1972

[54] THERMOLUMINESCENT DOSIMETRY READOUT APPARATUS

[72] Inventors: Bengt Bjarngard, Winchester, Mass.; Geoffrey A. M. Webb, Emerson, N.J.

[73] Assignee: Isotopes, Inc., Westwood, N.J.

[22] Filed: June 5, 1969

[21] Appl. No.: 830,726

[52] U.S. Cl. .................................................250/71.5, 250/71 R
[51] Int. Cl. .........................................................G01t 1/11
[58] Field of Search ........................................250/71, 71.5

[56] References Cited

UNITED STATES PATENTS

| | | | |
|---|---|---|---|
| 3,246,150 | 4/1966 | Stoddart et al. | 250/71.5 |
| 3,300,643 | 1/1967 | McCall | 250/71 |
| 3,376,416 | 4/1968 | Rutland et al. | 250/71 |
| 3,487,209 | 12/1969 | Perry | 250/71.5 |

Primary Examiner—James W. Lawrence
Assistant Examiner—D. Nelms
Attorney—Heit, Gipple & Jacobson

[57] ABSTRACT

A thermoluminescence dosimetry readout system adaptable to different applications and comprising a basic thermoluminescent dosimetry readout apparatus in which a dosimeter is heated by a strong alternating current to emit thermoluminescent light. The light flux is converted to an electric current which is converted to a pulse train. The pulse train is counted by a four decade counter and the result, which is proportional to the integrated signal, is displayed on Nixie tubes. Numerous accessories form part of the system and comprise a thermocouple to contact the heating element during heating for indicating its temperature; recorders to record the light flux and temperature patterns; a printer to print identifications, Nixie displays and peak temperatures; and means for entering the identifications. The accessories may be used in numerous combinations to provide systems for various applications.

14 Claims, 15 Drawing Figures

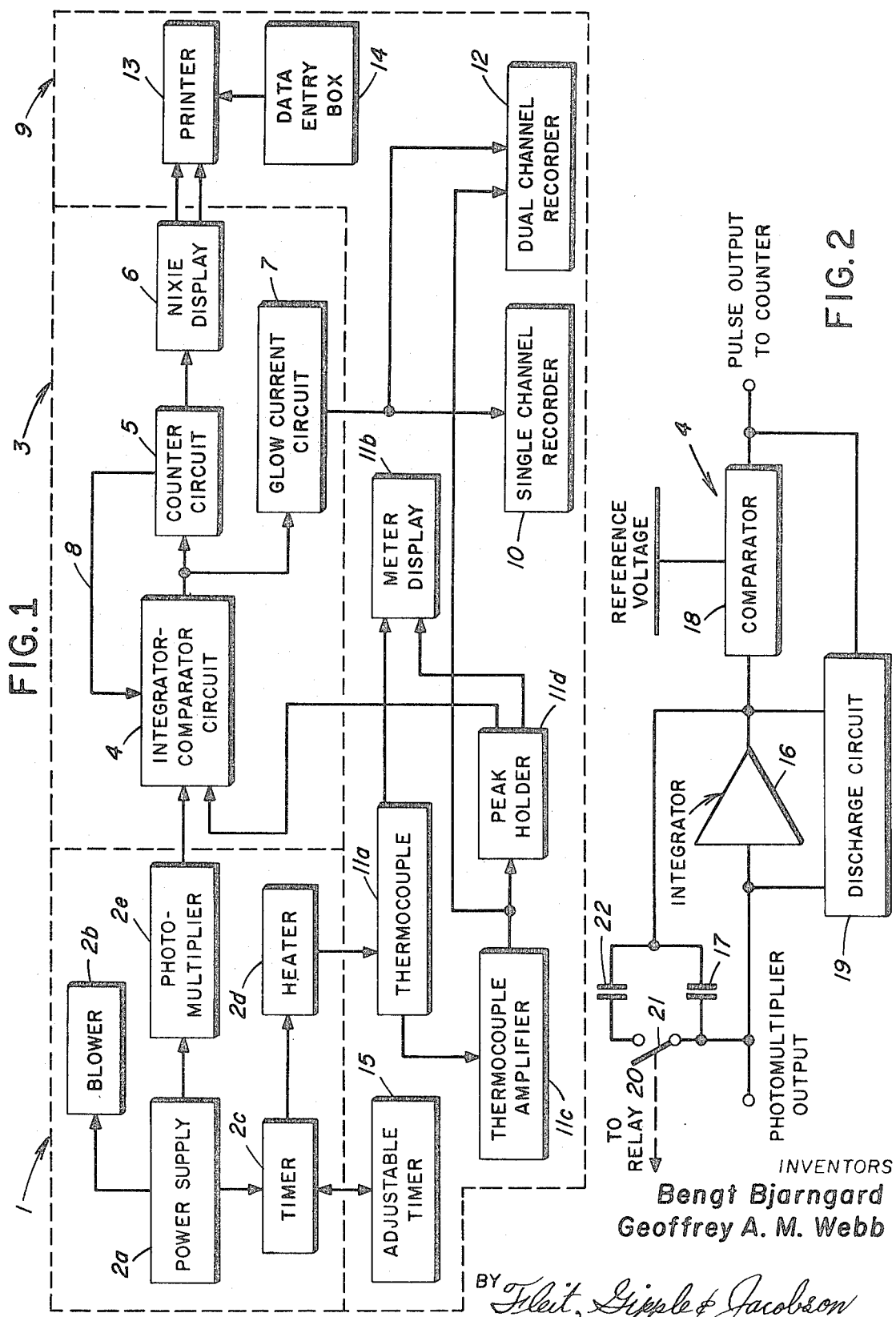

INVENTORS
Bengt Bjarngard
Geoffrey A. M. Webb

BY Fleit, Gipple & Jacobson
ATTORNEYS

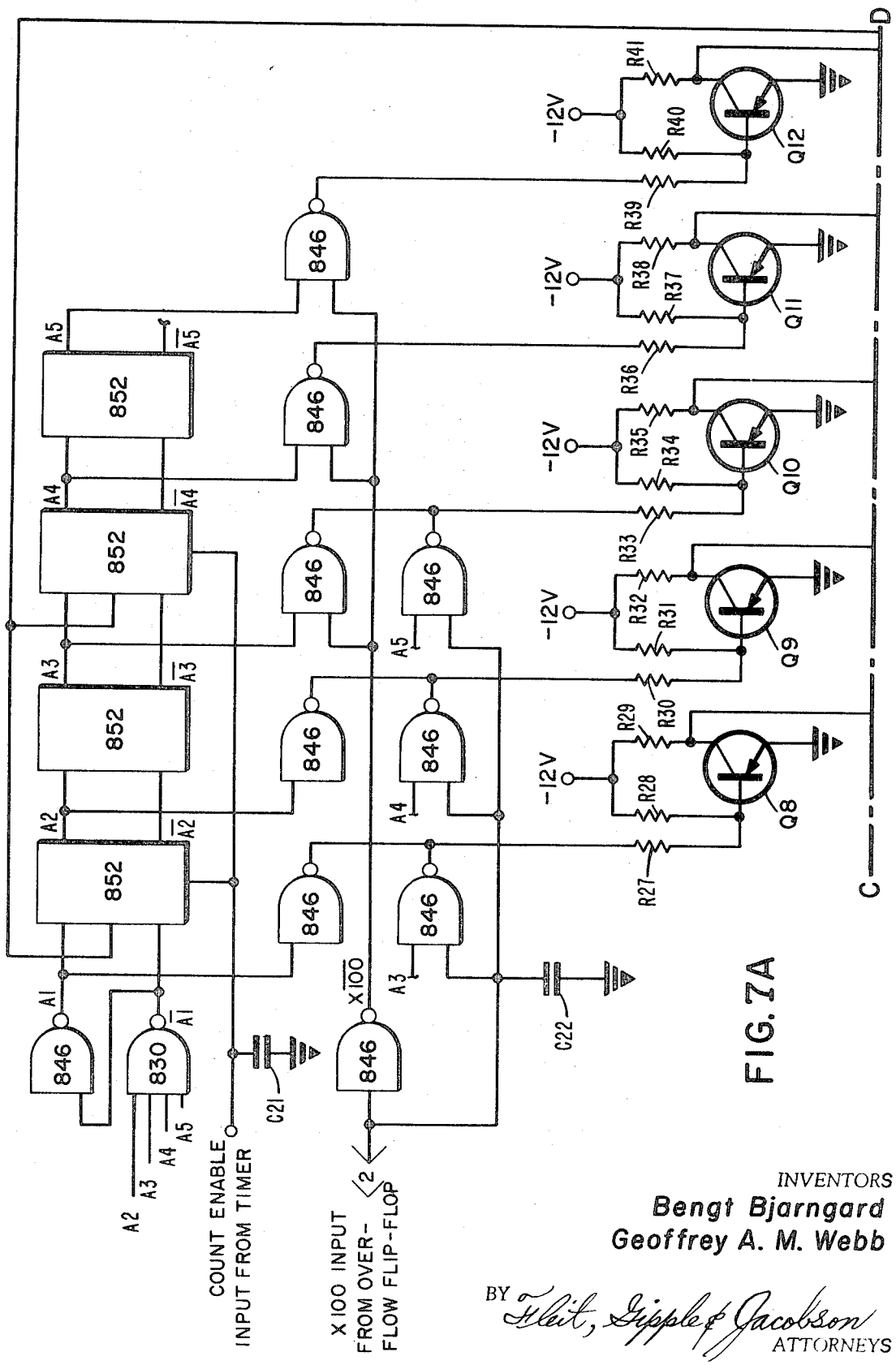

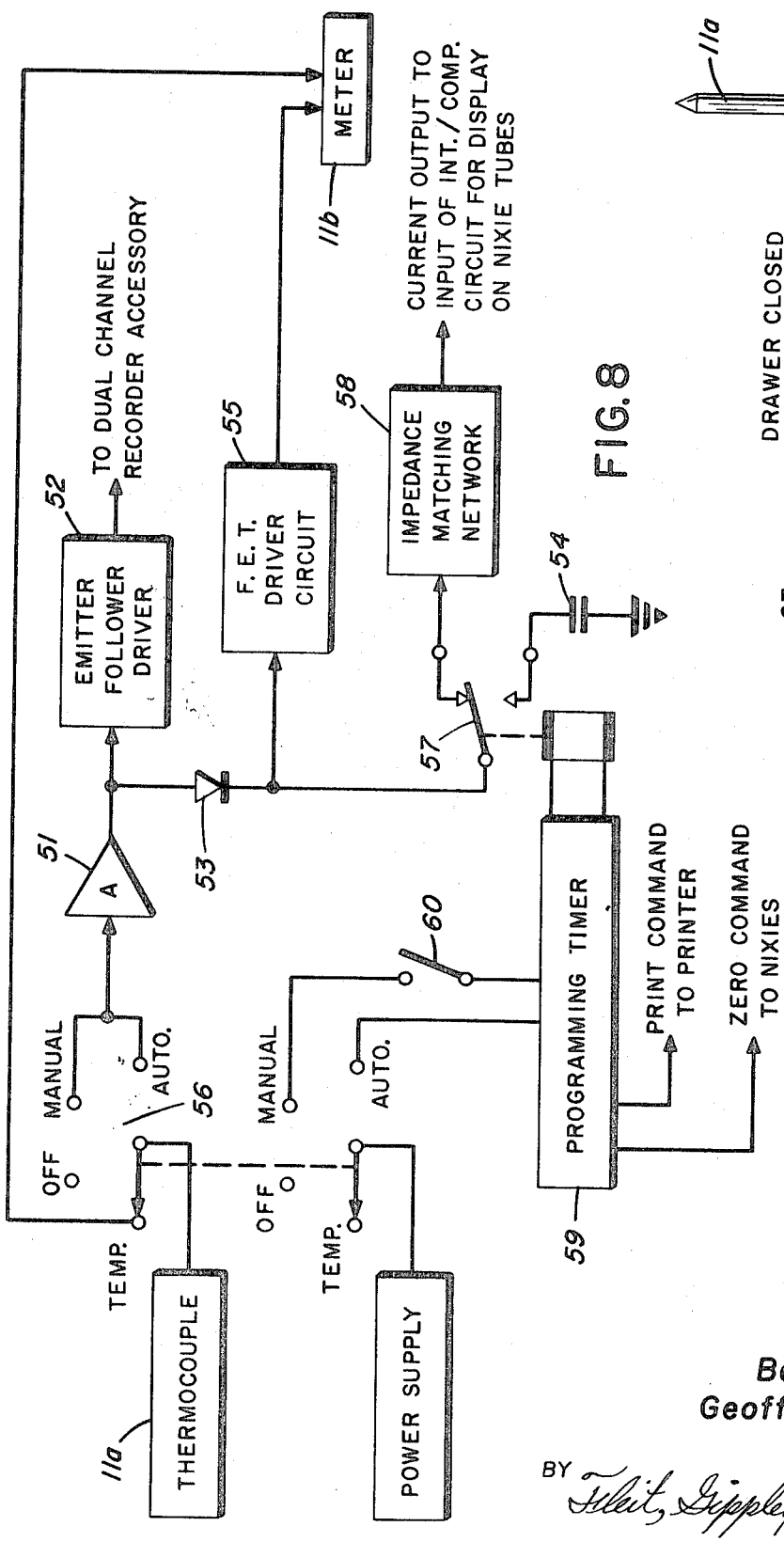
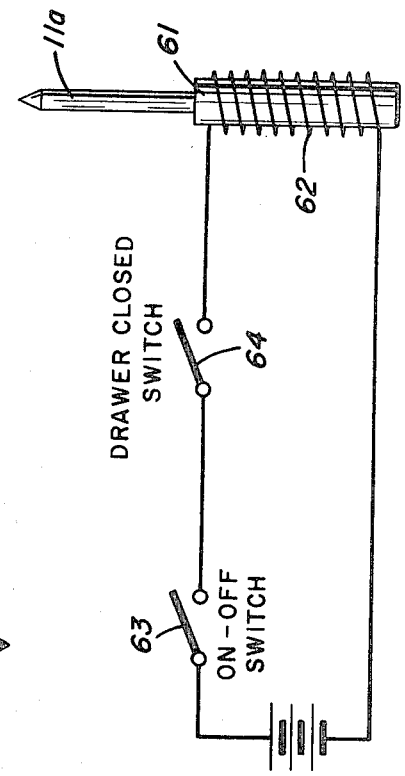
FIG. 8
FIG. 9

INVENTORS
Bengt Bjarngard
Geoffrey A. M. Webb

BY Fleit, Gipple & Jacobson
ATTORNEYS

THERMOLUMINESCENT DOSIMETRY READOUT APPARATUS

BACKGROUND OF THE INVENTION

Thermoluminescent dosimetry readout devices have been known for some time and several types of devices have been on the market. Examples of such devices are set forth in U.S. Pat. No. 3,176,133, issued to McCall et al., U.S. Pat. No. 3,288,997 issued to McCall, and U.S. Pat. No. 3,300,643 issued to McCall, all of which are assigned to the assignee of the present application.

In general, the known devices operate as follows. One of the many types of thermoluminescence dosimeters is placed on a heating element and manually inserted into a light tight container. The container is then purged of oxygen as the heating element and dosimeter are heated by a strong alternating current until thermoluminescence light is emitted by the dosimeter. The light flux is converted by a photomultiplier tube into an electric current which is in turn converted to a count for readout purposes. This count is then picked up and ultimately displayed by means of a digital voltmeter or a Nixie type display system.

There are several disadvantages associated with these known devices. In general, the major disadvantage to known devices is that they cannot, by choice of accessories, be converted into systems best suited to a particular type of application. As a consequence, the useful applications for such devices are quite limited. In addition to the above, there are no means presently known for accurately determining the temperature to which the dosimeter is heated, for recording light and temperature patterns, or for permanently printing on paper the results of the light flux integration and the peak temperature reached during readout as evidence of correct operation.

SUMMARY OF THE INVENTION

The basic inventive thermoluminescence dosimetry readout apparatus for measurement of the radiation dosage absorbed in thermoluminescent materials comprises:

a. A sample insertion mechanism, manually operated, for use with removable and reusable heating elements to accept loose phosphor powder, solid phosphor-Teflon dosimeters and other solid dosimeters of various geometric forms:

b. A variable constant current heat control to adjust the heating rate and the maximum temperature of heating elements through ranges required for the emission of thermoluminescence of the various phosphors and dosimeters;

c. A photomultiplier and associated high voltage power supply for the detection of the light emitted and for the amplification of the resulting electrical signal;

d. A current-to-frequency converter for the conversion of photomultiplier anode current into a train of pulses, pulse frequency being proportional to the current;

e. A four decade counter for accumulating the pulses and for presenting the result on four display tubes as well as in binary coded decimal form for printer means;

f. Automatic range changing circuitry, actuated by saturation of the four decade counter, for reducing the sensitivity of the current-to-pulse converter and for extending the range by a factor of 100, this switch circuitry including an indicator light and a printer output;

g. Internal programmed timing control with associated switching means for automatic sequencing of the circuit operation;

h. Power supplies for voltages required by the system components;

i. Provisions for inert gas flows in the sample chamber including adjustment valve and flow meter; and j. A current amplifier giving 0–1 mA current proportional to the photomultiplier anode current for glow curve registration, the circuit including automatic range switches for reducing the amplification by a factor of ten in up to five steps to maintain the output within specified limits.

The accessories which may be used in conjunction with the basic apparatus to form several complete systems comprise:

k. A single channel recorder for displaying the light output as a function of time during the heating cycle;

l. A temperature sensor for measuring the temperature of the heating element during the readout cycle, the temperature sensor being connected to a display meter;

m. A dual channel recorder for displaying the light output and temperature simultaneously as a function of time during the heating cycle;

n. A printer for permanently recording the display of the integrated light flux from the Nixie tubes together with an identification number;

o. A data entry device for entering an identification number for printing as in (n);

p. A peak temperature holding device with means for causing the peak temperature to be displayed on the Nixie tubes sequentially to the integrated light flux and for causing both of these to be printed as in (n), either manually or automatically; and q. An adjustable timer for enabling the functions as in (g) to be varied in time.

The present invention comprises an improvement over known thermoluminescent dosimetry readout devices in that it consists of a basic unit with a number of accessories which may be combined, in different combinations, to provide systems oriented to specific applications. The accessories can give records of integrated light flux and temperature. In addition, a thermocouple device is provided to contact the heating element during heating for giving an accurate indication of the temperature achieved. Also, and in particular, the present invention comprises an improvement in thermoluminescent dosimetry readout devices in which the charging capacitor and digital volt meter are replaced by an integrator-comparator circuit and a counter-display circuit which together constitute an analog to digital converter. A pulse frequency, directly proportional to photomultiplier current, is generated by the integrator-comparator circuit and is counted and displayed by the counter-display circuit on four decimal indicator tubes. System parameters may be selected so that the number displayed is the integral of the received current directly in coulombs (1 digit = $10^{-10}$ coulomb). A range change feature provides low range indicating up to 999.9 nano coulombs and a high range indicating up to 99,990.0 nano coulombs with the switchover being automatic and indicated appropriately.

The principle of operation of the basic unit of the inventive apparatus can briefly be described in the following way. One of the many types of thermoluminescence dosimeters is placed on a heating element and is manually inserted into the instrument. The readout cycle is started and the heating element and the dosimeter are heated by a strong alternating current, thermoluminescence light thus being emitted by the dosimeter. The light flux is converted by a photomultiplier tube into an electric current which is integrated by electronic circuitry. A current-to-frequency converter transforms the current into a train of pulses which is counted by a four decade counter and the result is displayed on Nixie tubes. The time integral of the current is also presented in a form suitable for the printer accessory. In addition, the photomultiplier anode current is amplified to 0–1 mA by a current with automatic range switching for the recording of glow curves.

One basis for the capability of the basic unit to use a variety of dosimeter forms as well as different phosphors, is the system of reusable and exchangeable heating elements, such as those described in U.S. Pat. No. 3,176,133. Loose powder is measured by pouring same into high-resistivity planchets from the containers used during irradiation. For readout of phosphor-Teflon disc and rod dosimeters, special heating elements are used, these having been designed to ensure reproducible thermal contact with the dosimeters. Most other dosimeters in solid form can be used as well.

The heating element is inserted by a slide into the instrument. Tough, long-lived contacts of a copper beryllium alloy give a firm grip around the edges of the heating element during heating. Their construction reduces changes in contact resistance and ensures a reproducible heater current flow. Furthermore, the heater current is kept reproducible within narrow limits by a constant current heat control. This module regulates the heater current if small variations in resistance should occur between different heating elements.

A photomultiplier tube - selected for a very low dark current, a large range of measurable light fluxes and a high stability - is the first stage in the high performance measuring system. A Teflon tube socket effectively prevents leakage currents.

The high voltage power supply has excellent long term stability. It is continuously adjustable which simplifies the exact adjustment of the overall sensitivity of the instrument. The photomultiplier dynode resistor string draws enough current from the high voltage power supply to permit accurate measurements even at very high light flux levels.

The anode current of the photomultiplier goes into the current-to-frequency converter and is integrated on a small polystyrene capacitor. When the charge collected on this capacitor reaches a given value, the capacitor is rapidly discharged by a solid state switch. At the same time, a pulse is generated into a four decade solid state counter. The integration of anode current then starts again and the cycle is repeated. In this way, pulses are generated at a rate proportional to the photomultiplier anode current. The integrated number of pulses is displayed by Nixie gas discharge tubes.

The counter has a capacity of 9,999 counts. The next pulse activates an automatic range switch, this making the counter reset to 100. The sensitivity is simultaneously reduced by a factor of 100 and the counting then proceeds to 9,999. An indicator lamp "X100" is now on, and the maximum value that can be displayed is consequently 999,900.

The measuring cycle is controlled by a timing motor. Once the "START" button is actuated the timer operates a series of relays in a programmed and accurate reproducible way. This feature makes routine operation with high precision extremely simple.

The instrument also has a glow current amplifier with automatic range switching. This circuitry gives an amplified output suitable to drive the recorder accessories, proportional to the momentary value of the photomultiplier anode current. Before the recorder goes off scale, the circuit automatically switches range by a factor of ten. This range switching may be repeated in five steps.

For measurements of small doses, the instrument is equipped with a gas inlet with flow meter and a fine adjustment valve. The use of the inert gas flow process, which is described in U.S. Pat. No. 3,300,643, makes measurement with LiF loose powder down to 10 mR possible and improves precision with other types of phosphor as well as other dosimeters.

Printed circuits are used for all subassemblies to further increase reliability and facilitate servicing. Integrated circuits are used in the display module.

The basic unit is constructed as four separate modules, the high voltage power supply, the heater control, the photomultiplier and sample insertion module, and the display module. The last module also contains the low voltage power supply for the display module. The four modules are designed to combine ruggedness with ease of disassembly for service and maintenance.

One of the accessories for the basic unit is a single channel recorder which is fed by the output of the glow current amplifier. This is a separate unit connected to the main unit by a cable. It receives power, input and control command via this cable.

Another of the accessories for the basic unit is a device for sensing the temperature of the heating element and comprises a thermocouple adapted to be brought into contact with the heating element by a solenoid. The output from this device is displayed on a meter calibrated in temperature. The output is also amplified to a level suitable to drive the recorder accessory. Further, the output is fed into a "peak holder" circuit which stores the maximum temperature attained during a readout cycle. This is partly built into the heater control module and partly built into the photomultiplier module of the basic unit.

An added accessory for the basic unit is a dual channel recorder which can be fed by the output of the glow current amplifier and the temperature sensor amplifier simultaneously. This is a separate unit connected to the main unit by a cable. It receives power, input signals and control commands via this cable.

A further of the accessories for the basic unit is a digital printer. This can print, on paper, the digital display of the Nixie tubes. In the event that range switching has occurred with actuation of the "X100" lamp, the printer multiplies the display by 100 before printing. The printer can also print an identification number simultaneously with the Nixie display. The printer is a separate unit connected to the main unit by a cable.

Another of the accessories for the basic unit is a means for entering an identification number to be printed by the printer. This means may take the form of a four-digit number set by hand on four switches or may be a four-digit number sensed by means of microswitches and actuators from the edge of a notched card which has previously been notched in a binary-coded decimal code. This is a separate unit connected to the printer by a cable.

Still another of the accessories for the basic unit is an adjustable timer which replaces the fixed timer in the main unit. The adjustable timer is equipped with a variable speed motor and is provided with means for changing the timing and sequence of the operations performed by the main unit. This is a separate unit connected to the main unit by a cable.

Still a further accessory for the main unit provides the capability of automatically storing and printing the time integral of the light flux and peak temperature information. When the basic unit is equipped with a temperature sensor and printer, this accessory provides for the operations as follows. When the "START" button is activated, the normal cycle of measurement is carried out, the peak temperature being stored. At the conclusion of this cycle, the Nixie display of light flux is automatically printed, the display is erased, the peak temperature from storage is retrieved and transmitted to the Nixie display so that one digit is equivalent to 1° C., and finally the Nixie display of peak temperature is printed. This accessory is contained within the heater control module of the basic unit.

It is therefore one object of the present invention to overcome the above-mentioned defects of the prior art and to provide a system comprising a basic apparatus and a number of accessories which may be combined into different systems for the optimum performance of particular desired applications.

It is another object of the present invention to overcome other above-mentioned defects of the prior art and to provide an apparatus which will quickly and accurately produce a readout indication.

It is a further object of the invention to provide means for accurately indicating the true temperature achieved by the dosimeter to assure proper functioning of the device and to ensure achievement of the desired temperature.

It is yet another object of the invention to provide means for recording the light flux and temperature patterns and for printing on paper the integrated light flux and maximum temperature.

It is a further object of the invention to provide an automatic means for recording and printing light flux and temperature information.

These and other objects of the invention, as well as many of the attendant advantages thereof, will become more readily apparent when reference is made to the following description taken in conjunction with the accompanying drawings.

BRIEF DESCRIPTION OF THE INVENTION

FIG. 1 is an overall block diagram of the present invention;

FIG. 2 is a detailed block diagram of the integrator-comparator circuit;

FIGS. 7A and 7B are detailed schematics of the glow current circuit;

FIG. 8 is a detailed block diagram of the temperature sensor accessory circuit;

FIG. 9 is a schematic of the circuit for moving the thermocouple into contact with the planchet;

Figure 3:
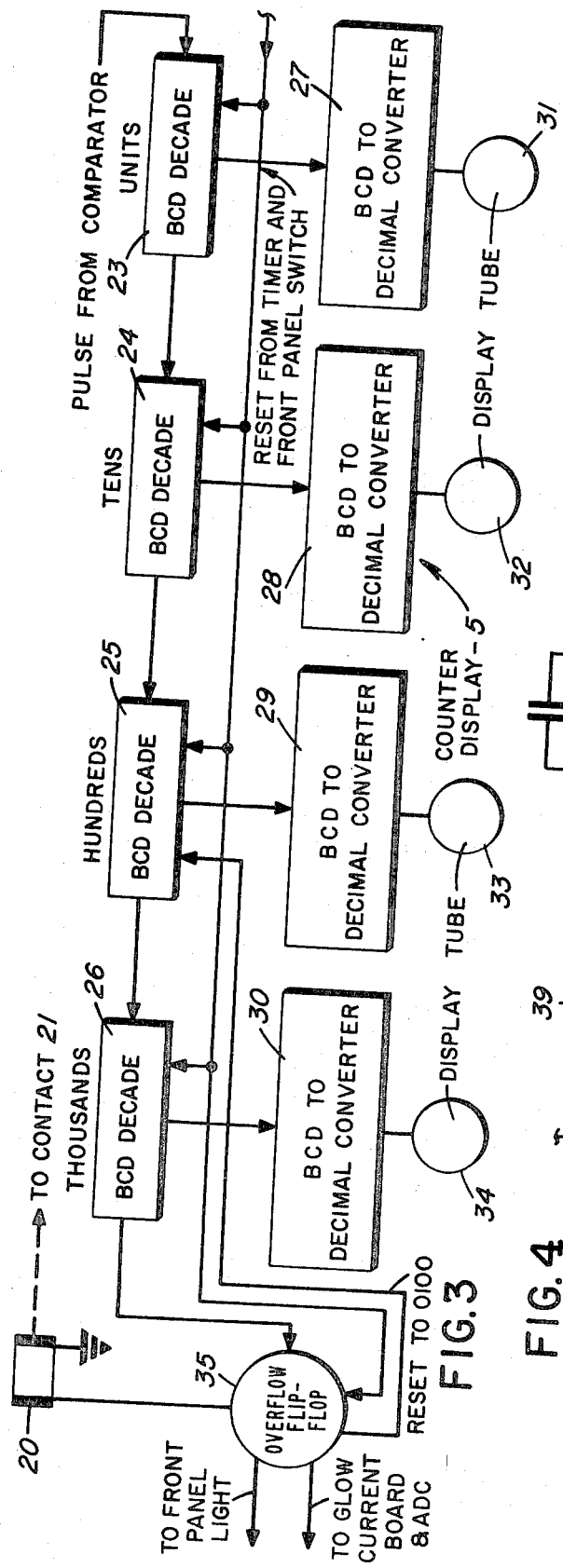
FIG. 3 is a detailed block diagram of the counter-display circuit.

Considering first the general operation, with reference to FIG. 1, the portion of the diagram enclosed in broken line block 1 represents the known thermoluminescent dosimeter element readout apparatus, such as that disclosed in the above-mentioned U.S. Pat. No. 3,288,997 issued to McCall.

This apparatus includes a power supply 2a supplying power to a blower 2b, a timer 2c, a heater 2d and a photomultiplier 2e. An improvement over the known device to the basic unit is shown in broken line block 3 and comprises an integrator-comparator circuit 4 which generates a pulse frequency directly proportional to photomultiplier current. These pulses generated by the circuit 4 are counted by a counter circuit 5 with the count being displayed by a display circuit 6. A glow current circuit 7 serves to amplify the integrator-comparator output to drive the recorder accessories. Automatic range switching is accomplished through line 8.

A further improvement over known devices is shown in broken line 9 and comprises the accessories which may be added to the basic unit in many combinations to form different systems. A single channel recorder 10 may be used to display the output of the glow current amplifier 7. A thermocouple 11a may be brought into contact with the heating element 2d and may cause the temperature to be displayed on a meter 11b or, via an amplifier 11c, on a dual channel recorder 12 which may simultaneously display the glow current as indicated by circuit 7. The display on the display module 6 may be printed on a printer 13 which may also be equipped for printing an identification number from a data entry box 14. The output from amplifier 11c may further be fed into a peak-holder 11d or fed into the integrator-comparator circuit 4 subsequent to printing the display and hence routed to the printer 13. An adjustable timer 15 may be used to replace the automatic timer 2c for control of cycle parameters.

Turning now to FIG. 2, photomultiplier current is fed to an integrator 16 whose output is a voltage equal to the time integral of the input current divided by the value of an integrating capacitor 17. This voltage is compared with a reference voltage by a comparator 18. When the integrated output voltage is equal to the reference voltage, a signal is fed to a discharge circuit 19 which discharges the integrating capacitor 17 and brings the output of the integrator 16 back to its initial value. At the same time, the comparator 18 generates an output pulse which is fed to the counter circuit 5. The discharge operation is completed after approximately one microsecond and the integrator begins the next integration cycle. It can readily be seen that the integrate-discharge cycle occurs at a rate dependent upon the magnitude of the input current. With a capacitor 17 of $10^{-10}$ farads and a reference voltage of 1 volt, each cycle represents an integrated charge of $10^{-10}$ coulomb.

The counter 5, shown in detail in FIG. 3, has a capacity of 9,999 counts. The next count received after this number generates an overflow signal which resets the counter to 0100 and energizes a relay 20 which has associated therewith a plurality of contacts 21 in the integrator-comparator circuit 4. Relay 20 places the $10^{-10}$ farad integrating capacitor 17 in parallel with a $10^{-8}$ farad capacitor 22 (FIG. 2), thus multiplying the integration time constant by 100. Thus, with relay 20 energized, every count received by the counter represents an integrated charge of $100 \times 10^{-10}$ coulombs. Operation in this mode is indicated by a front panel "X100" light (not shown).

The input current may vary from $10^{-11}$ amperes, corresponding to 1 count in 10 seconds, to $10^{-5}$ amperes, corresponding to 100,000 counts per second, with the $10^{-10}$ farad capacitor connected.

The counter 5 consists of four binary coded decimal (BCD) decades 23 through 26. Each decade counts up to nine and then returns to zero. A carry is generated during the transition from nine to zero which causes the next more significant stage to increase its reading by one count. The four digit BCD code from each decade is converted by converters 27 through 30, respectively, to a decimal number which, in turn, controls a decimal display tube 31 through 34. The four decades 23 through 26 are reset by panel switches (not shown) to an all zero condition. The counter 5 accumulates the display counts from the integrator-comparator circuit 4 until all four decades contain nine counts (a reading of 9,999). The next count causes the counter to generate a carry from the thousands decade which energizes an overflow flip-flop 35. This operation causes the counter to immediately reset to 0100 (10,000 divided by 100), the X100 light (not shown) to be lit, the larger capacitor 22 to be switched into the integrator (thus requiring 100 times as much current for one count) and the glow current circuit to increase its sensitivity by 100.

The analog to digital converter, formed by the integrator, comparator and counter circuits, generates a sawtooth wave output whose slope is directly proportional to the input current from the photomultiplier tube. The glow current circuit 7 generates a voltage proportional to the slope which is, of course, proportional to the photomultiplier current itself. Range change circuitry starts at maximum gain and automatically reduces gain in five decade steps. The first decade is the most sensitive and provides full output for an input current of $10^{-9}$ amperes. Range changing continues automatically with a full scale sensitivity of $10^{-5}$ amperes on the least sensitive range. Operation of the analog to digital converter overflow circuitry, which, as previously described, switches into the circuit a larger integrating capacitor, is automatically compensated for by jumping two decades backwards to increase sensitivity by a factor of 100. Range changing is unidirectional and is only initiated by a signal reaching the top of a range. Thus, the system reaches a range determined by the peak current level and remains on that range for the remainder of the measurement cycle.

Figure 4:
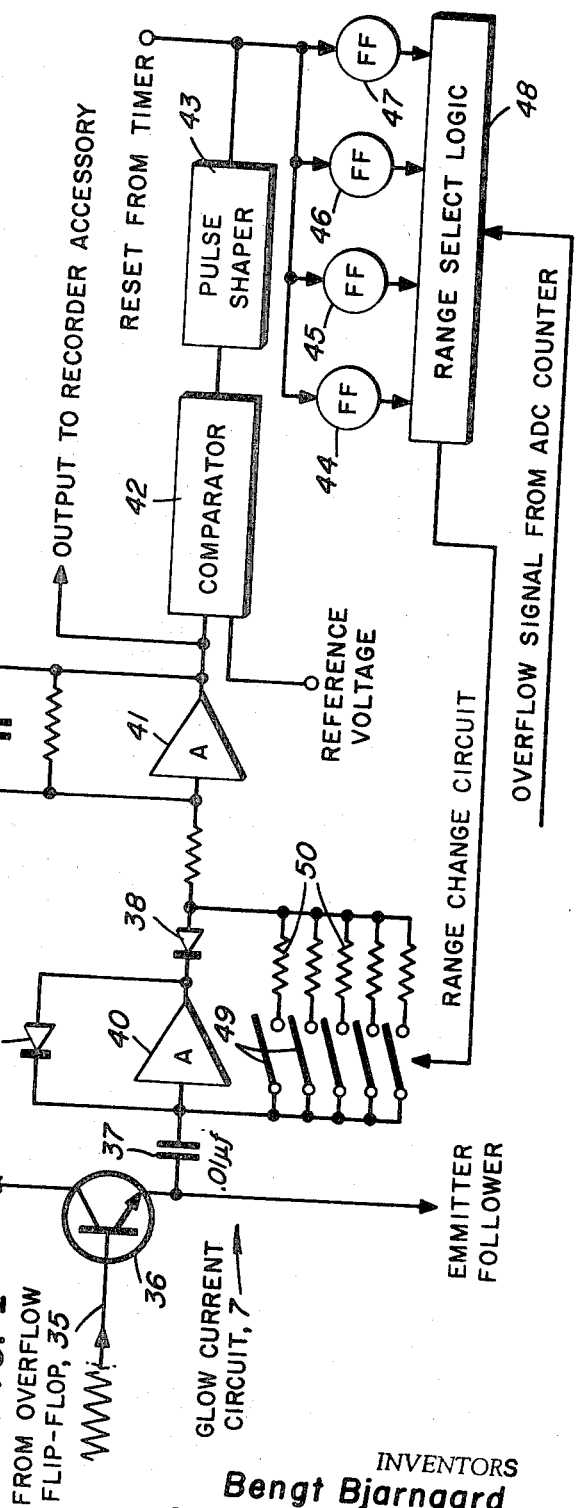
FIG. 4 is a detailed block diagram of the glow current circuit.

FIG. 4 shows a simplified block diagram of the glow current converter 7. The sawtooth wave generated by the integrator is passed through an isolation emitter follower 36. The output from the emitter is differentiated by a 0.01 mfd. $0.01 \times 10^{-6}$ farad) capacitor 37. The resulting current through the capacitor has a positive value proportional to the slope of the sawtooth wave and a negative current, during the reset period, of considerably larger magnitude. Diodes 38 and 39, positioned in the feedback path of a current amplifier 40, cause the amplifier to have a very low gain for negative going signals and a gain proportional to the selected feedback resistor for positive going signals. The output of the current amplifier 40 is amplified approximately 4.5 times by a successive amplifier stage 41. The output of the second amplifier 41 is used to drive external recording devices (not shown). In addition, this signal is fed to a comparator 42 whose output, in turn, is fed through a pulse shaper 43 to a chain of four flip-flop circuits 44 through 47. These flip-flop circuits are reset to zero when the system is initially started, resulting in the selection, through range select logic 48, of the highest gain node for the current amplifier. When the output from the second amplifier 41 reaches the reference level at the comparator 42, the comparator generates a pulse which turns on the first flip-flop. This causes the gain of the current amplifier to be reduced by 10 by appropriate closing of contacts 49 adding to the circuit appropriate resistors 50. This sequence can be repeated four times at which time the amplifier gain is at its minimum. Operation of the overflow flip-flop on the third, fourth or fifth range causes the system to switch backwards two decades (more sensitive) to compensate for the reduced sawtooth slope resulting when the larger integrating capacitor is switched into the analog to digital converter circuitry.

Figure 5A:
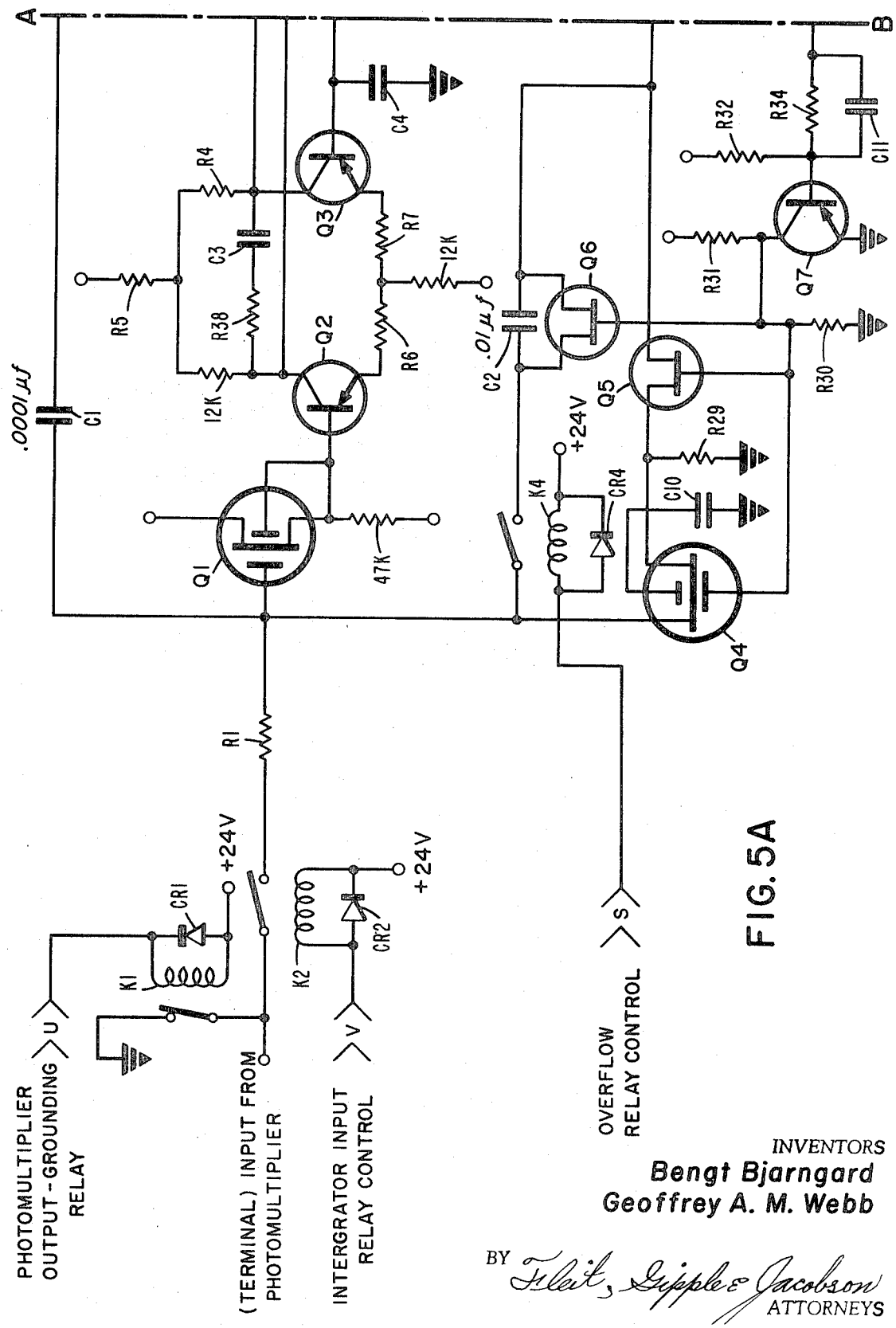
FIGS. 5A and 5B are detailed schematics of the integrator-comparator circuit.
Figure 5B:
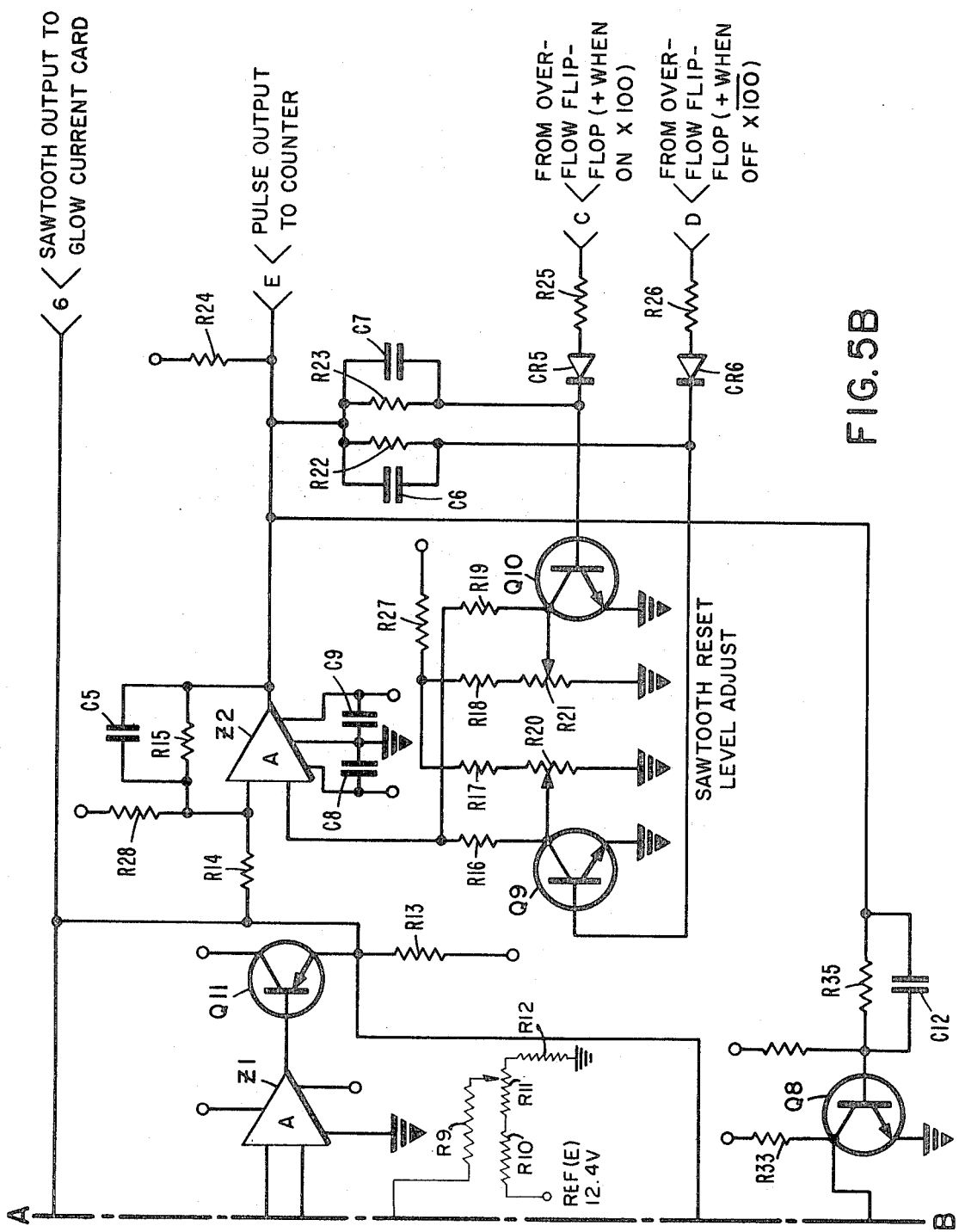

Considering now the detailed operation of the integrator, with particular reference to FIG. 5, Q1, Q2, Q3, Z1 and Q11 form a DC operational amplifier with a gain of between 500 and 1,000. A high impedance input stage is provided by the MOS field effect transistor Q1 which has an input leakage current of approximately one picoampere. Q1 is operated as a source follower with a gain slightly less than one to drive the differential amplifier formed by Q2 and Q3. The input to Q3 is a DC signal whose level is variable and which is adjusted to obtain a zero offset voltage at the input of Q1. A low offset voltage at this point is not required for integrator accuracy since the high output impedance of the photomultiplier tube causes the input current to be essentially independent of input voltage. However, a low offset voltage at this point substantially reduces the susceptibility of the system to errors caused by leakage paths to ground. The differential output of Q2 and Q3 is fed to Z1 which is an integrated differential amplifier. Q11 is connected as an emitter follower to provide a low output impedance for the operational amplifier.

The $10^{-10}$ farad integrating capacitor C1 is connected directly from the output of Q11 to the input of Q1. K4, when energized, connects C2 ($10^{-8}$ farads) directly in parallel with C1 to increase the integration time constant by 100 as previously discussed.

The comparator comprises an integrated amplifier Z2 with a differential input. The integrator output is connected to Z2 through a 1.2 K. (1 $K$, = 1,000 ohms) resistor R14. When this input is less than the reference voltage at the other input, the comparator output is approximately 0.5 volts negative. This output swings to approximately 3 volts positive when the input voltage reaches the reference level. R15 and C5 provide regenerative feedback which forces the input more positive, as soon as the output goes positive, thus increasing the operating speed of the comparator and generating a slight hysteresis to prevent multiple output pulsing at the moment of equality.

The circuitry described to this point simply causes the output of the comparator to swing positive when the integrator output is equal to the reference level. The positive signal performs two functions, it causes the integrating capacitor to be discharged, as is explained in the following section, and it causes the reference signal at the input of the comparator to become clamped to ground. Q9 and Q10 control the reference level in conjunction with the two associated potentiometers. Until the counter has exceeded a count of 9,999, the overflow flip-flop 35 on the counter is OFF and a positive voltage appears at pin D of the integrator-comparator circuit. This positive voltage holds Q9 conducting with its collector clamped to ground. This disables the R20 potentiometer and the reference voltage is determined by the adjustment of R11 in conjunction with the divider formed by R16 and R19. After the 9,999 count has been exceeded and the overflow flip-flop energized (at the same time energizing K4 to change capacitors), pin C becomes positive and the reference voltage for the comparator is controlled by the R20 potentiometer. Thus, two independent adjustments are provided for the two ranges to allow for capacitor tolerances and variations in the reset levels.

Q9 and Q10 have the additional function of bring the reference voltage to zero after the comparator swings positive. As previously described, at any one time, either Q9 or Q10 (but not both) is conductive. The positive comparator output signal turns the non-conducting stage on through R22 and R23. At this point both Q9 and Q10 are conducting and the reference voltage at the comparator is zero. This voltage remains at zero until the integrator output drops below zero as a result of discharge circuit operation. At this point, the comparator returns to the level set by the potentiometer (R20, R21) and remains there until the integrator level again exceeds the reference level. The circuitry just described ensures complete discharge of the integrating capacitor since it requires the integrator output to decrease from the reference level to zero before resetting the comparator.

The discharge circuitry is formed by Q4 through Q8. Q4 is an MOS field effect transistor selected for low leakage current and for low coupling capacity from its gate to its source terminal. Q5 and Q6 are conventional field effect transistors. Q4, Q5 and Q6 are operated either at cut-off (−10 volts) or with zero gate voltage. A field effect transistor with zero gate voltage becomes a pure resistor between its source and drain terminals. The magnitude of this resistance for Q5 and Q6 is less than 20 ohms and is a few hundred ohms for Q4. Q7 and Q8 hold the field effect transistor gate voltages at −10 volts when the comparator output is negative. When the comparator output swings positive, the gate voltage is clamped to ground. This places the two ON resistances of Q4 and Q5 in parallel with C1 and causes C1 to discharge. Q4 and Q5 form a divider when cut off, thus preventing the output voltage of the integrator from appearing across the drain of Q4. Since the source of Q4 is connected to the zero potential summing point of the integrator and the drain is also at zero, the leakage current of Q4 does not enter the summing junction. Q6 provides a similar reset function for the $10^{-8}$ farad integrating capacitor. The time constant of the discharge paths are a few tenths of a microsecond maximum.

Figure 6A:
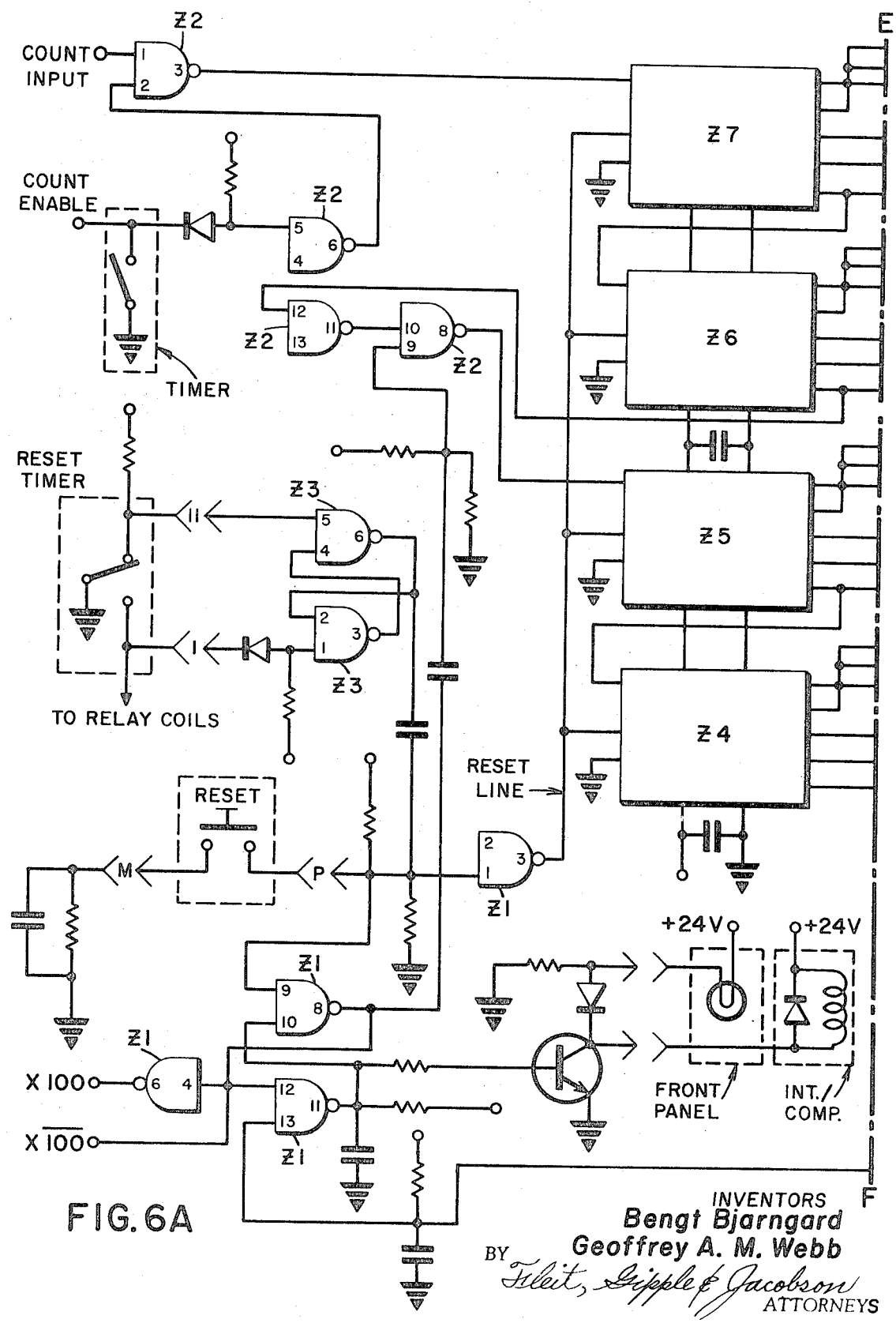
FIGS. 6A and 6B are detailed schematics of the counter-display circuit.
Figure 6B:
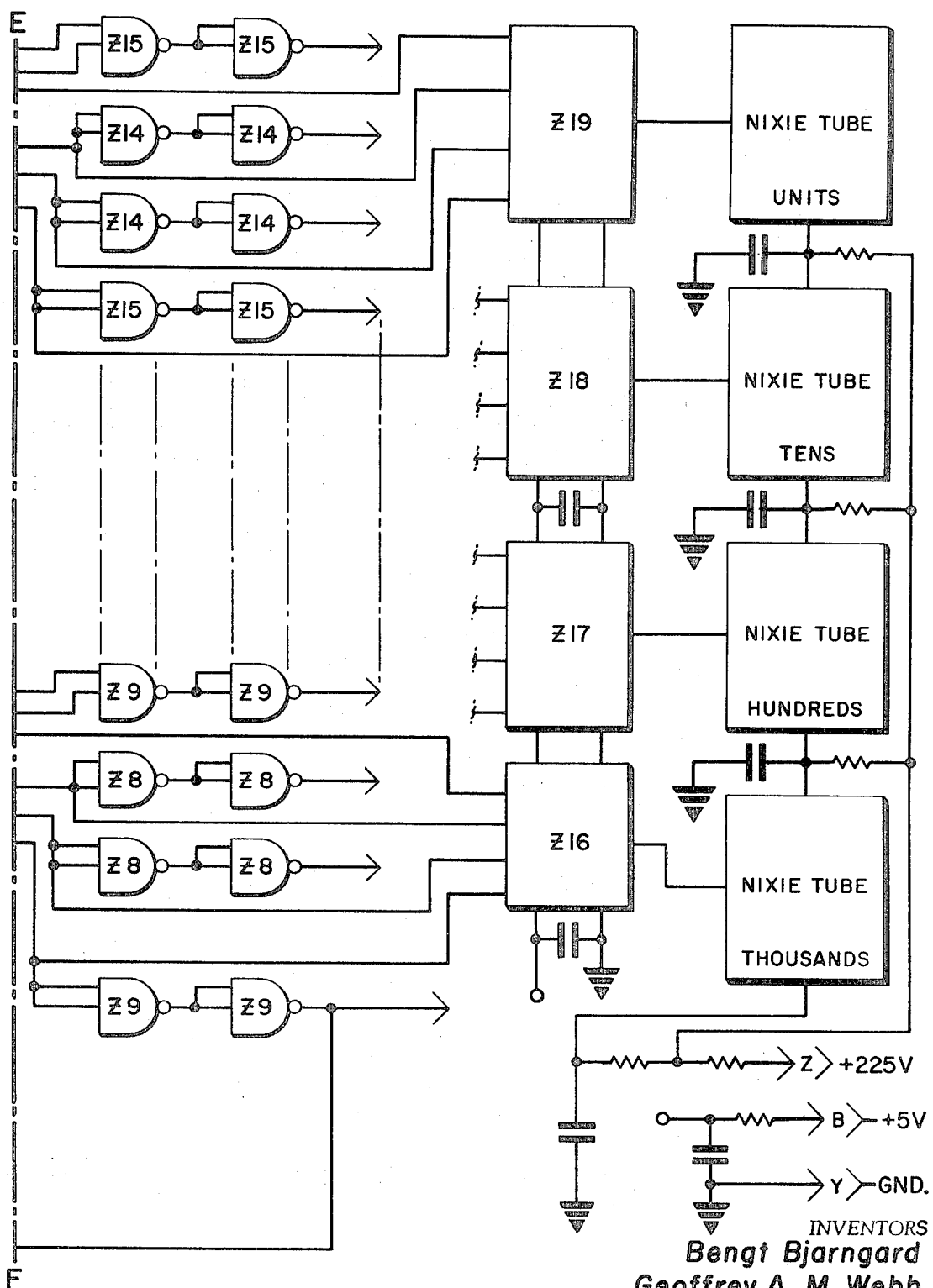

Turning now to FIG. 6, the count input on pin K is a positive pulse generated by the integrator-comparator. This pulse is inverted by the 1, 2, 3 section of Z2 and fed to the input of the first BCD decade Z7. The 4, 5, 6 section of Z2 suppresses the count when the timer switch is in its open position. Z4, 5, 6 and 7 are integrated circuit BCD decades, a complete decade being contained in a single dual in-line package. The four decades form a serial counter with Z7 being the input stage (least significant digit) and Z4 the most significant digit. Z16, 17, 18 and 19 are integrated circuit BCD to decimal converters, a complete decimal digit conversion circuit being contained in a single dual in-line package. These converters are specifically designed for driving gas filled Nixie decimal display tubes and operate with approximately 55 volts on the output lines. One of the converter's 10 output lines is always connected to ground, the specific line depending on the count accumulated in the associated BCD decade. This grounded line grounds one input of the Nixie tube and causes the decimal digit connected to that input to be displayed.

Reset to zero is accomplished by momentarily making pin 3 of the BCD decades positive. This is accomplished by the 1, 2, 3 section of Z1 in conjunction with the reset switches. Closure of the reset switch momentarily grounds pin 1 of Z1 through the 0.1 mfd. capacitor causing the output of Z1 to swing positive. Continued closure of the reset switch has no effect since the grounding of pin 1 ceases as soon as the 0.1 mfd. capacitor charges to 5 volts. The 10K resistor in parallel with C1 is too large to act as a ground for Z1, its function being merely to discharge the 0.1 mfd. capacitor when the reset switch is released.

When the counter reaches 9,999, the BCD output of each decade is a 1 and an 8. On the next count all four decades carry to 0000. The 8 output of the most significant decade Z4 becomes ground, this change going through a double inversion for isolation (through two stages of Z8) to one input of Z1. Pins 11, 12 and 13 of Z1 and 8, 9 and 10 of Z1 are connected to form flip-flop 35. This flip-flop is reset by the same circuit that resets the counter so that pin 8 of Z1 is positive and pin 11 is at ground. The carry pulse from the most significant digit grounds pin 13 of Z1 and causes the flip-flop to change state indicating an overflow condition. This appears at pin 13 as a positive voltage labelled X100 causing K4 to be energized and lighting the X100 light which is in parallel with K4. The diode and 750 ohm resistor associated with the X100 light provide a small pre-enerization bias to the light to reduce the turn-on surge. The negative going output from pin 8 to Z1 is capacitively coupled to pin 9 of Z2. This output pulse causes Z5 to count one digit causing the counter to read 0100.

Figure 7B:
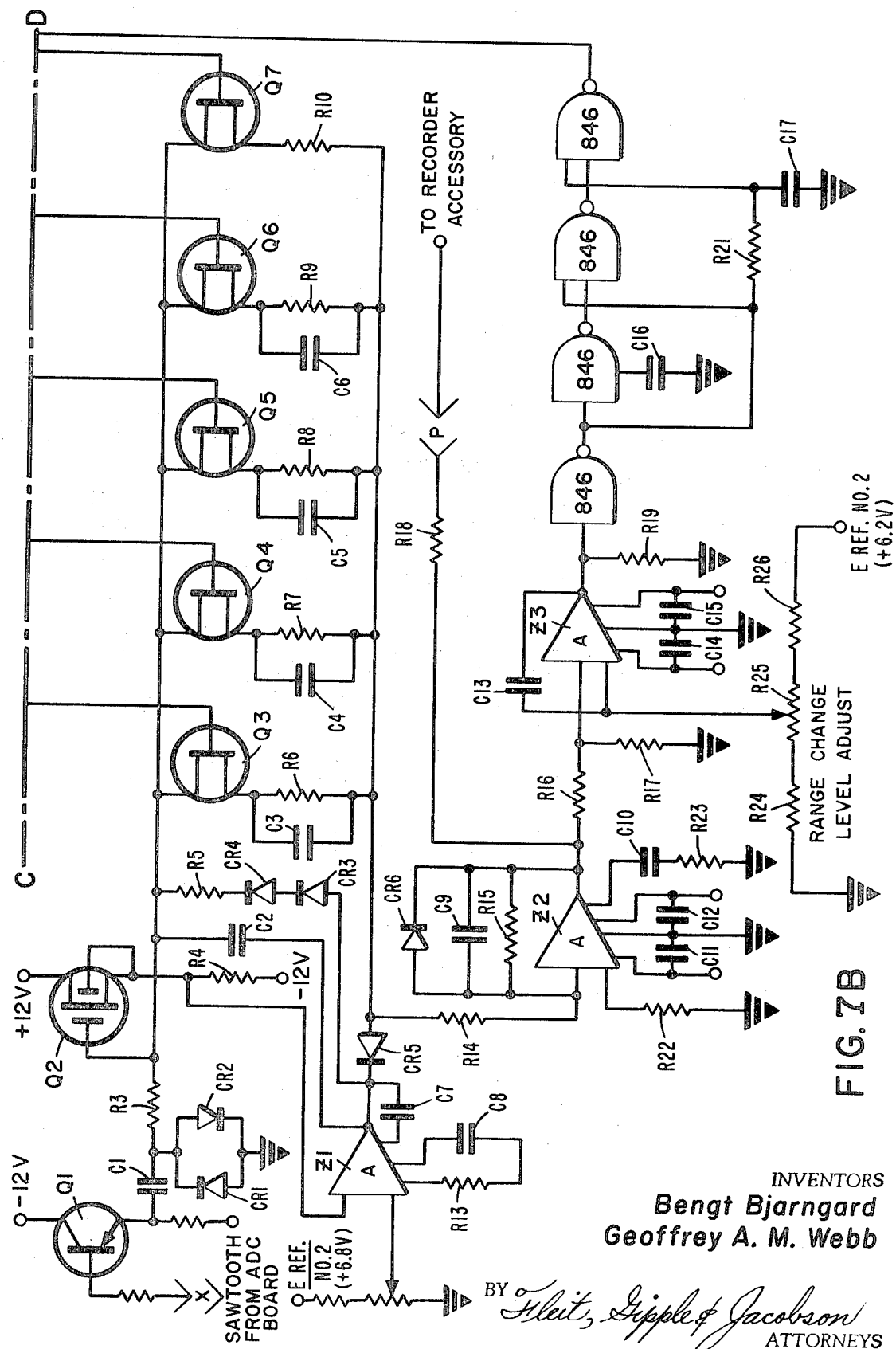

Turning now to a detailed study of the glow current circuit of FIG. 7, Q1 provides an isolation emitter follower to prevent C1, the differentiating capacitor, from loading the analog to digital converter. CR1 clips the negative going voltage at the input of the current amplifier so that it does not exceed 0.6 volts. This quickens the system recovery time from the negative transient. CR2 limits the positive input voltage to the current amplifier when power is first turned on in order to prevent a latching condition which can lock up Z1.

The amplifier input stage is Q2. An MOS field effect transistor is used in the source follower mode because of its low input leakage current. The source follower drives one input of Z1 which is a high gain, differential input, operational amplifier. A low gain feedback path for negative going input signals is provided by diodes CR3 and CR4. CR3 is a low leakage diode which prevents errors due to leakage currents at elevated temperatures. CR4 is a fast switching diode. Positive currents from the differentiating capacitor cause the output of Z1 to go negative. This negative output is passed by CR5 to the feedback resistors. Only one of these feedback resistors is conducting at any given time. The others are out of the circuit because their field effect transistor switches are cut off. The feedback operates to provide a feedback current equal but opposite to the capacitor current. Thus, the voltage output of the amplifier is proportional to the feedback resistor and the differentiating current.

In the high gain range, the 10 megohm feedback resistor causes an amplifier output of one volt with a capacitor current of 0.1 microamperes. Range changing is effected by removing the cutoff voltage from one of the field effect transistors Q3 through Q7 as is discussed under the description of the range-change circuitry.

The fixed gain amplifier Z2 provides a fixed gain of approximately 4.5. Z2 is also an integrated operational amplifier but having less open loop gain than Z1. This amplifier has a very low gain at high frequencies to reduce errors caused by line frequency pickup and transients. The output of the fixed gain amplifier may be used to drive external recording devices. This output is also fed to Z3, the integrated circuit comparator, which normally has a positive output. It swings negative when the output of Z2 is equal to the reference input at pin 3. This reference voltage is adjusted to set the range switching level.

The pulse shaper 846 is an integrated, dual input, inverting "and" gate (NAND gate). Four of these circuits are contained in a single dual in-line package. The circuit 830 is a four input NAND gate with a node connection brought out at the junction of the AND diodes. Two of these units are contained in a single package. The four stages following the comparator form a delay circuit which swings positive approximately 50 microseconds after the comparator swings negative. However, if the comparator output should swing positive during this delay period, the circuit resets and does not change output levels. The output of the pulse shaper is fed to the flip-flop modules 852.

The chain of flip-flops 852 is an integrated dual flip-flop (two per package) in which the four flip-flops are reset at the beginning of the operating cycle. Each time that the comparator swings negative (signalling the end of a range) the flip-flop chain advances one digit. Starting at 0000, it changes to 1,000, then 0100, 0010, and finally to 0001. Thus, there are five different operating conditions.

The logic converts the five different states of the four flip-flops to five DC levels which are fed to the drive transistors which, in turn, control the range changing field effect transistors. Only one of the drive transistors is conducting at any given time. The others are cut off causing a cutoff voltage of −12 volts at the gates of the other field effect transistors. The A1 through A5 outputs provide flip-flop state information. In the second range, for example, A2 will be positive and the other outputs will be at ground. A1 is generated by an 830 NAND stage and an 846 used as an inverter when all of the flip-flops are at zero, this is the state after reset and before the first range change and causes the input of Q3 to be grounded, thus selecting the 10 megohm feedback resistor. Input number 2 from the overflow flip-flop is at ground until the count of 9,999 has been exceeded. At this point it becomes positive. When pin 2 is a ground, Q8 is controlled by the A1 signal, Q9 by the A2 signal, etc. After the overflow has occurred, Q8 is controlled by the A3 signal, Q9 by the A4 signal and 010 by the A5 signal. Thus, it is necessary that at least two range changes occur (from A1 to A3) before the X100 circuitry functions through the range change logic.

Turning now to the accessories, it is important that there be an indication that the apparatus is functioning properly, namely that the planchet is being heated. This is accomplished in the present invention by means of the temperature sensor shown in FIG. 8. The temperature sensor consists of a thermocouple 11a, the output of which is either fed to a meter 11b or to an amplifier 51. The output from the amplifier 51 is fed through an emitter follower driver circuit 52 to the recorder accessories 10 or 12. The output is also fed, via a diode 53, to a peak holding circuit consisting basically of a capacitor 54 which stores the maximum voltage developed by the amplifier 51. The voltage across capacitor 54 is sensed by a high impedance field effect transistor driver circuit 55 and is displayed on the meter 11b when a switch 56 is in its "PEAK-HOLD" position. The charge stored on the capacitor 54, which represents the peak temperature, may also be fed, via a switch 57 and a resistance network 58, to the input of the integrator or comparator 16 in place of the photomultiplier output. The charge is then counted, in the same way as the glow current, and is displayed on the Nixie tubes.

The operation described immediately above is controlled by an auxiliary timing motor 59 which forms a part of the temperature sensor and which causes the following functions to be performed at the end of a normal readout cycle when the switch 56 is positioned on "AUTO." The main timer 2c, after completing its cycle, causes the temperature sensor programmer 59 to start. The programmer 59 routes peak temperature readings to the Nixie tubes. The programmer then commands the printer 13 to print the temperature reading from the Nixie tubes. The programmer 59 then stops. When the switch 56 is set to "MANUAL," initiation of the programmed cycle is perfected by a manual switch 60 which starts the programmer 59.

In order to reduce thermal inertia, the thermocouples of the type used in the present invention are generally constructed of rather thin wire, of the order of 0.003 inch diameter. The wires therefore have relatively poor wear characteristics. In order to obtain accurate temperature measurements, it is necessary that the thermocouple actually contact the planchet. Since the readout instrument in the present invention uses loose heating elements of various types, the thermocouples cannot be permanently attached to the heating elements. The present invention solves the above-mentioned contacting and wear problems by mounting the thermocouple 11a on a movable armature 61 or a solenoid 62, as is shown in FIG. 9.

In order to raise the thermocouple to an exposed position wherein it actually contacts the planchet, the apparatus on-off switch 63 must be on and the drawer closed. The closing of the drawer automatically closes microswitch 64. Thus, the thermocouple is in a retracted and protected position during opening and closing of the drawer and is exposed to contact the planchet when measurement is to take place.

Figure 10:
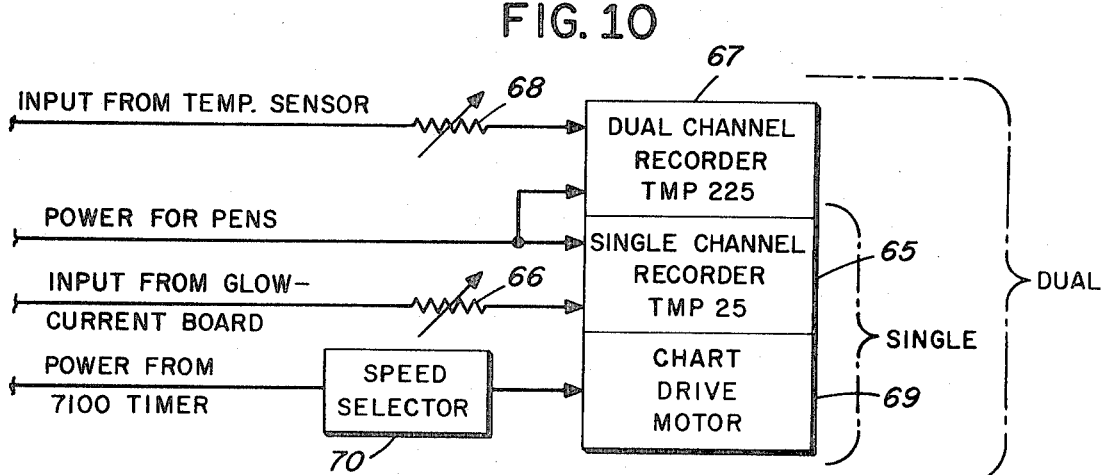
FIG. 10 is a block diagram of the single and dual channel recorders.

The output from the glow current circuit 7 and the temperature sensor 11a, via amplifier 11c, may both be fed into recorder accessories as shown in FIG. 10. In the single channel recorder only one pen assembly 65 is provided which accepts the signal from the glow current board of FIG. 7 via R18 and a sensitivity adjustment 66. The recorder may be a Techni-rite Electronics MODEL TMD-25 or equivalent. In the dual channel recorder an additional pen assembly 67 is provided which accepts the signal from the temperature sensor of FIG. 8 via a sensitivity adjustment 68. The recorder may be a Techni-rite Electronics MODEL TMD-225 or equivalent. Both recorders obtain their power from the basic unit timer assembly. The timer assembly is connected so that the pen assemblies are powered continuously, but the chart drive motor 69 is powered only during the readout cycle. The motor speed is governed by a chart speed selector 70.

The printer 13 is a standard ten column Victor printer with an interface enabling it to accept data in binary coded decimal form from the Nixie tube display. Normally, the value displayed on the tubes is printed in the right hand six columns. Two zeroes are used to indicate if the range switch X100 of FIG. 6 has been activated. The two zeroes are printed before the value displayed on the Nixie tubes, if the range switch has not been activated, and after the Nixie tubes values, when the X100 range switch has been activated. The remaining four columns are for printout of the identification number entered by the data entry box 14.

Figure 11:
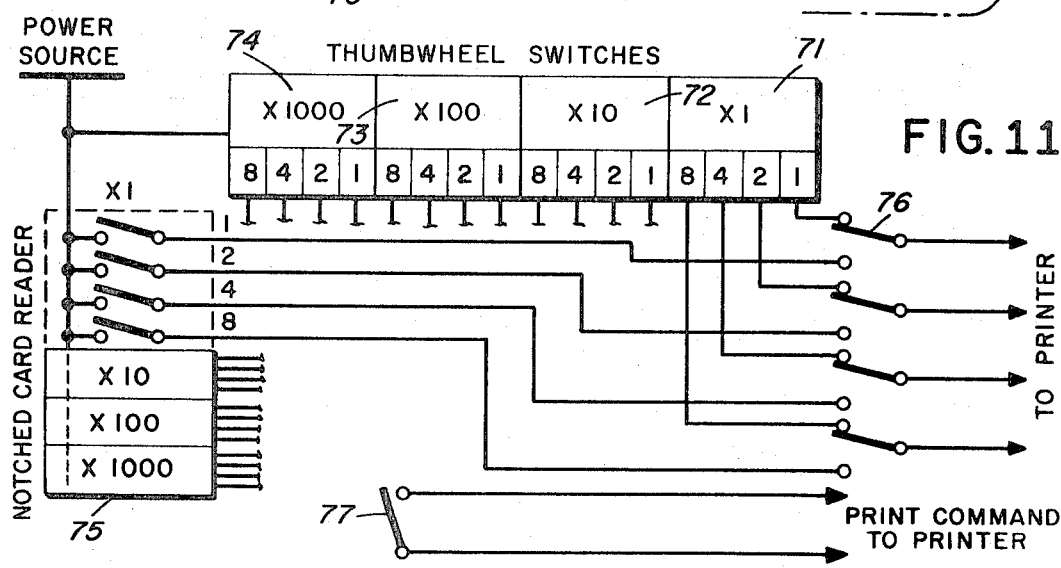
FIG. 11 is a schematic of the data entry box.

Referring to FIG. 11, there is shown the data entry box 14. The entry box contains four binary coded decimal thumbwheel switches 71 through 74. These switches provide output power along four lines in accordance with the number dialed. A further set of switches 75 constitutes the personnel badge reader.

Figure 12:
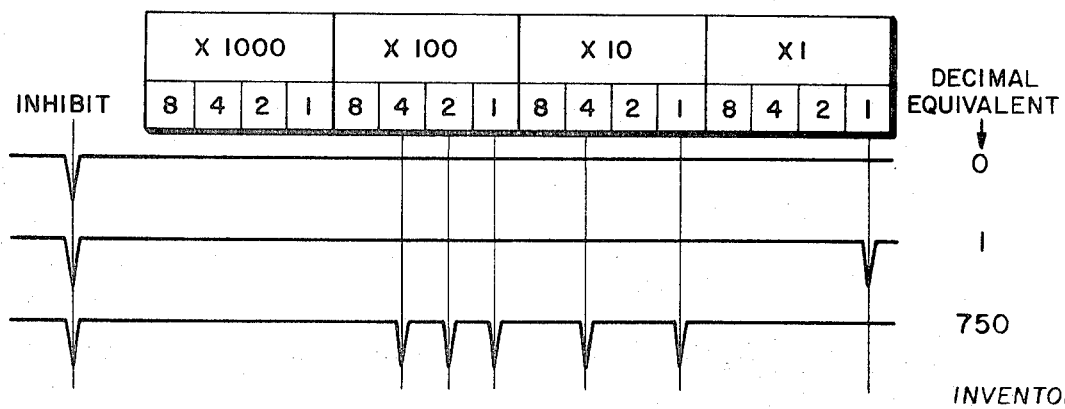
FIG. 12 is a diagram of the personnel badge coding for the data entry box.

The personnel badge is a device containing dosimeters and having a plastic card forming an integral part of the badge. This card may have a number from 0–999 written on it and the same number may be coded along the edge in binary coded decimal form as a series of notches and as is shown in FIG. 12.

When the card is placed in the personnel badge reader, the switches 75 are activated by the absence of notches in the card, thereby generating a binary coded decimal power output in accordance with the notched code of the badge. Either of the data entry forms, thumbwheel or personnel badge, may be selected and routed to the printer by the switch 76. The printer may be activated by the print command switch 77.

Another accessory is the adjustable timer 15 noted above. This timer entirely replaces the built-in fixed timer 2c and operates so that the separate functions of the reader can be individually controlled. In particular, the functions that may be controlled are the overall time of the cycle, the starting and stopping times of the heating cycle and the integration cycle.

These several accessories described above may be combined with the basic unit in many different manners, only two having been given. A system comprising a basic unit with a temperature sensor, adjustable timer and dual channel recorder may be used for research into glow curve shape, heating rate effects and archaeological luminescence at high temperatures, and is a versatile tool for research into thermoluminescence. A system comprising a basic unit with a temperature sensor, printer and data entry box may be used for rapid routine readout of personnel badges or other dosimeters with a permanent record of identification number, dose reading and maximum temperature reading from which correct operation of the machine may be inferred.

The present invention may be embodied in other specific forms without departing from the spirit or essential characteristics thereof. The present embodiments are therefore to be considered in all respects as illustrative and not restrictive. It is the intent, therefore, that the invention not be limited to the above but be limited only as defined in the appended claims.

We claim:

1. A thermoluminescence dosimetry readout apparatus for the measurement of radiation dose absorbed in thermoluminescent materials and comprising:

a. manually operated sample insertion means including removable and reusable heating elements for accepting loose phosphor powder, solid phosphor-Teflon dosimeters and other solid dosimeters of various geometric forms;
b. variable constant current heat control means for adjusting the heating rate and the maximum temperature of said heating elements through ranges required for emission of thermoluminescence of the various phosphors and dosimeters;
c. photomultiplier means for detecting the light emitted from said materials;
d. current-to-frequency converter means for converting the photomultiplier output current into a train of pulses, the pulse frequency of which is proportional to the current;
e. counter means comprising a four-decade counter associated with four display tubes for accumulating the pulses and presenting the result on the display tubes and further presenting the result in binary coded decimal form;
f. automatic range changing means actuated by the saturation of the counter for reducing the sensitivity of the current-to-pulse converter and thereby extending the range by a set factor;
g. current amplifier means for providing an output current proportional to the photomultiplier output current and including automatic range switches for reducing the amplification by a factor of ten in up to five steps to maintain the output within specific limits;
h. internal programmed timing control means for automatically sequencing the apparatus operation;
i. power supply means for energizing the apparatus; and
j. means to pass an inert gas over the material during heating.

2. The invention of claim 1 and further comprising thermocouple means adapted to sense the temperature of said heating elements and means for indicating the temperature sensed by said thermocouple.

3. The apparatus of claim 2 in combination with recorder means for permanently recording the light emitted from the materials and sensed by the photomultiplier and for simultaneously recording the temperature sensed by the thermocouple means, and means for activating said recorder means only during a preset readout cycle.

4. A thermoluminescence dosimetry readout apparatus for the measurement of radiation dose absorbed in thermoluminescent materials and comprising:

a. manually operated sample insertion means including removable and reusable heating elements for accepting loose phosphor powder, solid phosphor-Teflon dosimeters and other solid dosimeters of various geometric forms;
b. variable constant current heat control means for adjusting the heating rate and the maximum temperature of said heating elements through ranges required for emission of thermoluminescence of the various phosphors and dosimeters;
c. photomultiplier means for detecting the light emitted from said materials;
d. current-to-frequency converter means for converting the photomultiplier output current into a train of pulses, the pulse frequency of which is proportional to the current;
e. counter means for accumulating the pulses and presenting the result on the display tubes and further presenting the result in binary coded decimal form;
f. automatic range changing means actuated by the saturation of the counter for reducing the sensitivity of the current-to-pulse converter and thereby extending the range by a set factor;
g. current amplifier means for providing an output current proportional to the photomultiplier output current and including automatic range switches for reducing the amplification to maintain the output within specific limits;
h. internal programmed timing control means for automatically sequencing the apparatus operation;

i. power supply means for energizing the apparatus;
j. means to pass an inert gas over the material during heating;
k. thermocouple means adapted to sense the temperature of said heating elements but maintained remote from said heating elements until said insertion mechanism reaches a predetermined location at which time said thermocouple is brought near said heating elements; and
l. means for indicating the temperature sensed by said thermocouple.

5. The invention as recited in claim 4 and further comprising means to permanently print the temperature sensed by said thermocouple.

6. A thermoluminescence dosimetry readout apparatus for the measurement of radiation dose absorbed in thermoluminescent materials and comprising:
  a. manually operated sample insertion means including removable and reusable heating elements for accepting loose phosphor powder, solid phosphor-Teflon dosimeters and other solid dosimeters of various geometric forms;
  b. variable constant current heat control means for adjusting the heating rate and the maximum temperature of said heating elements through ranges required for emission of thermoluminescence of the various phosphors and dosimeters;
  c. photomultiplier means for detecting the light emitted from said materials;
  d. current-to-frequency converter means for converting the photomultiplier output current into a train of pulses, the pulse frequency of which is proportional to the current;
  e. counter means for accumulating the pulses and presenting the result on the display tubes and further presenting the result in binary coded decimal form;
  f. automatic range changing means actuated by the saturation of the counter for reducing the sensitivity of the current-to-pulse converter and thereby extending the range by a set factor;
  g. current amplifier means for providing an output current proportional to the photomultiplier output current and including automatic range switches for reducing the amplification to maintain the output within specific limits;
  h. internal programmed timing control means for automatically sequencing the apparatus operation;
  i. power supply means for energizing the apparatus;
  j. means to pass an inert gas over the material during heating; and
  k. external programmable timer means whose program is readily adapted for particular needs.

7. The device as recited in claim 6 in combination with recorder means for permanently recording the light emitted from the materials and sensed by the photomultiplier means, and means for activating said recorder means only during a preset readout cycle.

8. A thermoluminescence dosimetry readout apparatus for the measurement of radiation dose absorbed in thermoluminescent materials and comprising:
  a. manually operated sample insertion means including removable and reusable heating elements for accepting loose phosphor powder, solid phosphor-Teflon dosimeters and other solid dosimeters of various geometric forms;
  b. variable constant current heat control means for adjusting the heating rate and the maximum temperature of said heating elements through ranges required for emission of thermoluminescence of the various phosphors and dosimeters;
  c. photomultiplier means for detecting the light emitted from said materials;
  d. current-to-frequency converter means for converting the photomultiplier output current into a train of pulses, the pulse frequency of which is proportional to the current;
  e. counter means for accumulating the pulses and presenting the result on the display tubes and further presenting the result in binary coded decimal form;
  f. automatic range changing means actuated by the saturation of the counter for reducing the sensitivity of the current-to-pulse converter and thereby extending the range by a set factor;
  g. current amplifier means for providing an output current proportional to the photomultiplier output current and including automatic range switches for reducing the amplification to maintain the output within specific limits;
  h. internal programmed timing control means for automatically sequencing the apparatus operation;
  i. power supply means for energizing the apparatus;
  j. means to pass an inert gas over the material during heating; and
  k. data handling means for the entry of an identification code.

9. The device of claim 8, wherein said identification code is manually entered in said data handling means.

10. The device of claim 8, wherein said identification code is entered in said data handling means in response to a set of indicia on an identification card.

11. The device of claim 8 and further comprising printer means for printing said identification code with data indicative of the light detected by said photomultiplier means.

12. The device of claim 11 and further comprising means to automatically initiate said printer means at the conclusion of a measurement cycle.

13. A thermoluminescence dosimetry readout apparatus for the measurement of radiation dose absorbed in thermoluminescent materials and comprising:
  a. manually operated sample insertion means including removable and reusable heating elements for accepting loose phosphor powder, solid phosphor-Teflon dosimeters and other solid dosimeters of various geometric forms;
  b. variable constant current heat control means for adjusting the heating rate and the maximum temperature of said heating elements through ranges required for emission of thermoluminescence of the various phosphors and dosimeters;
  c. photomultiplier means for detecting the light emitted from said materials;
  d. current-to-frequency converter means for converting the photomultiplier output current into a train of pulses, the pulse frequency of which is proportional to the current;
  e. counter means for accumulating the pulses and presenting the result on the display tubes and further presenting the result in binary coded decimal form;
  f. automatic range changing means actuated by the saturation of the counter for reducing the sensitivity of the current-to-pulse converter and thereby extending the range by a set factor;
  g. current amplifier means for providing an output current proportional to the photomultiplier output current and including automatic range switches for reducing the amplification to maintain the output within specific limits;
  h. internal programmed timing control means for automatically sequencing the apparatus operation;
  i. power supply means for energizing the apparatus;
  j. means to pass an inert gas over the material during heating;
  k. thermocouple means adapted to sense the temperature of said heating elements;
  l. means for indicating the temperature sensed by said thermocouple;
  m. data handling means for the entry of an identification code; and
  n. printer means for printing said identification code with data indicative of the light detected by said photomultiplier means and with data indicative of the temperature sensed by said thermocouple means.

14. A thermoluminescence dosimetry system for rapid routine dosimetry and including a basic unit comprising: photomultiplier tube means, means to dispose thermoluminescent material that has been exposed to radiation in an optically coupled relation to said photomultiplier tube means, means to heat said thermoluminescent material to release light as a function of the radiation to which said material has been exposed, analog to digital converter means operatively connected to receive current from the photomultiplier tube and convert said current to a pulse train, the pulse frequency of which is directly proportional to said current, means to count said pulse train, and means to display said count on a plurality of decimal indicator tubes; and further including: temperature sensing means for measuring the temperature of the heating means, program means for automatically controlling the operation of said basic unit, data handling means for providing a readout of an identification number associated with a particular dosimeter, and printer means for permanently recording said identification number, a dose reading and a maximum temperature reading from which correct operation may be inferred.

* * * * *